(12) United States Patent
Yamaguchi et al.

(10) Patent No.: US 12,391,191 B2
(45) Date of Patent: Aug. 19, 2025

(54) VEHICLE WINDOW GLASS WITH ONBOARD CAMERA

(71) Applicant: AGC Inc., Tokyo (JP)

(72) Inventors: Naohiro Yamaguchi, Tokyo (JP); Hideomi Kamizono, Tokyo (JP); Takashi Kawahara, Tokyo (JP)

(73) Assignee: AGC INC., Tokyo (JP)

( * ) Notice: Subject to any disclaimer, the term of this patent is extended or adjusted under 35 U.S.C. 154(b) by 504 days.

(21) Appl. No.: 17/696,295

(22) Filed: Mar. 16, 2022

(65) Prior Publication Data

US 2022/0306015 A1    Sep. 29, 2022

(30) Foreign Application Priority Data

Mar. 23, 2021 (JP) .................. 2021-048530

(51) Int. Cl.
| | |
|---|---|
| *H04N 7/18* | (2006.01) |
| *B60R 11/04* | (2006.01) |
| *H04N 23/55* | (2023.01) |
| *B60R 11/00* | (2006.01) |

(52) U.S. Cl.
CPC ............ *B60R 11/04* (2013.01); *H04N 23/55* (2023.01); *B60R 2011/0026* (2013.01)

(58) Field of Classification Search
CPC .. B60R 11/04; B60R 2011/0026; H04N 23/55
See application file for complete search history.

(56) References Cited

U.S. PATENT DOCUMENTS

| | | | |
|---|---|---|---|
| 10,081,310 B2 | 9/2018 | Kasai et al. | |
| 10,189,421 B2 | 1/2019 | Matori | |
| 11,007,950 B2 | 5/2021 | Urata et al. | |
| 2011/0233248 A1 | 9/2011 | Flemming et al. | |
| 2015/0015713 A1* | 1/2015 | Wang ................... | H04N 7/18 348/148 |
| 2016/0119509 A1* | 4/2016 | Wato .................... | G03B 17/55 348/148 |
| 2016/0222185 A1* | 8/2016 | Bockmann ........... | C08K 3/04 |
| 2016/0318278 A1* | 11/2016 | Nakayama ........... | B32B 3/30 |
| 2017/0274836 A1 | 9/2017 | Kasai et al. | |

FOREIGN PATENT DOCUMENTS

| | | |
|---|---|---|
| CN | 110091809 A | 8/2019 |
| DE | 10211444 B4 | 11/2004 |
| DE | 10 2011 056 128 B3 | 4/2013 |
| JP | H10-024464 A | 1/1998 |
| JP | H10-275964 A | 10/1998 |
| JP | 2003-022703 A | 1/2003 |
| JP | 2003-071884 A | 3/2003 |

(Continued)

*Primary Examiner* — Patrick E Demosky
(74) *Attorney, Agent, or Firm* — Foley & Lardner LLP (57) ABSTRACT

A vehicle window glass with an onboard camera includes a vehicle window glass configured to be mounted to a vehicle; a bracket fixed to an inner side surface of the vehicle window glass; an onboard camera attached to the bracket; and a hood member disposed on a vehicle forward side of the onboard camera; wherein the hood member has a surface facing the vehicle window glass and exhibiting a black appearance having an L value of at most 27.0 and is made of a material having a gloss value of less than 6.0 measured based on JIS Z 8741-1997.

8 Claims, 6 Drawing Sheets

(56) References Cited

FOREIGN PATENT DOCUMENTS

| | | |
|---|---|---|
| JP | 2012-504518 A | 2/2012 |
| JP | 6076460 B2 | 2/2017 |
| JP | 2017-061276 A | 3/2017 |
| JP | 2017-171166 A | 9/2017 |
| JP | 6307545 B2 | 4/2018 |
| JP | 2018-111766 A | 7/2018 |
| JP | 2019-014338 A | 1/2019 |
| JP | 2020-006827 A | 1/2020 |
| JP | 2020-131809 A | 8/2020 |

\* cited by examiner

VEHICLE WINDOW GLASS WITH ONBOARD CAMERA

TECHNICAL FIELD

The present invention relates to a vehicle window glass with an onboard camera.

BACKGROUND ART

It has been known that a metal or resin bracket is attached to an inner side surface of a vehicle window glass, and an onboard camera is attached to the bracket to acquire information in front of the vehicle window glass through the vehicle window glass in a vehicle, such as an automobile. It has also been known that in front of the onboard camera, there is disposed a hood member, which is formed in a substantially isosceles trapezoid shape to spread in a width direction of the vehicle toward a vehicle forward direction.

For example, Patent Document 1 listed below discloses that a hood member is a resin member colored in black in order to prevent rays transmitting through the vehicle window glass from being reflected on the hood member such that the reflected rays are projected into an onboard camera.

PRIOR ART DOCUMENTS

Patent Documents

Patent Document 1: JP-A-2020-131809

DISCLOSURE OF INVENTION

Technical Problem

However, when the hood member is merely colored in black, rays transmitting through the vehicle window glass could be reflected on the hood member such that a reflected image is projected on an inner side surface of the vehicle window glass. When the reflected image is projected on the inner side surface of the vehicle window glass, the onboard camera could detect the reflected image, resulting in an incorrect detection as if an obstacle exists in front of the vehicle.

The present invention is proposed in consideration of the above-mentioned problem. It is an object of the present invention to provide a vehicle window glass with an onboard camera, which is capable of preventing a ray transmitting through the vehicle window glass from being reflected on a hood member such that a reflected image is projected on an inner side surface of the vehicle window glass.

Solution to Problem

According to one aspect of the present invention, there is provided a vehicle window glass with an onboard camera, which includes a vehicle window glass configured to be mounted to a vehicle; a bracket fixed to an inner side surface of the vehicle window glass; an onboard camera attached to the bracket; and a hood member disposed on a vehicle forward side of the onboard camera; wherein the hood member has a surface facing the vehicle window glass and exhibiting a black appearance having an L value of at most 27.0 and is made of a material having a gloss value of less than 6.0 measured based on JIS Z 8741-1997.

Advantageous Effects of Invention

In accordance with the vehicle window glass with an onboard camera, to which the present invention is applied, it is possible to prevent a ray transmitting through the vehicle window glass from being reflected on a hood member such that a reflected image is projected on an inner side surface of the vehicle window glass.

DESCRIPTION OF EMBODIMENTS

Now, embodiments of the vehicle window glass with an onboard camera according to the present invention will be described in reference to the accompanying drawings. It should be noted that the elements and members referred to in the following embodiments are merely examples, and the present invention is not limited to a mode including these elements and members. In Description, the terms of "upward", "downward", "forward", "rearward", "left", "right", "outer" and "inner" are indicative of directions in a case where a vehicle travels forward.

Figure 1:
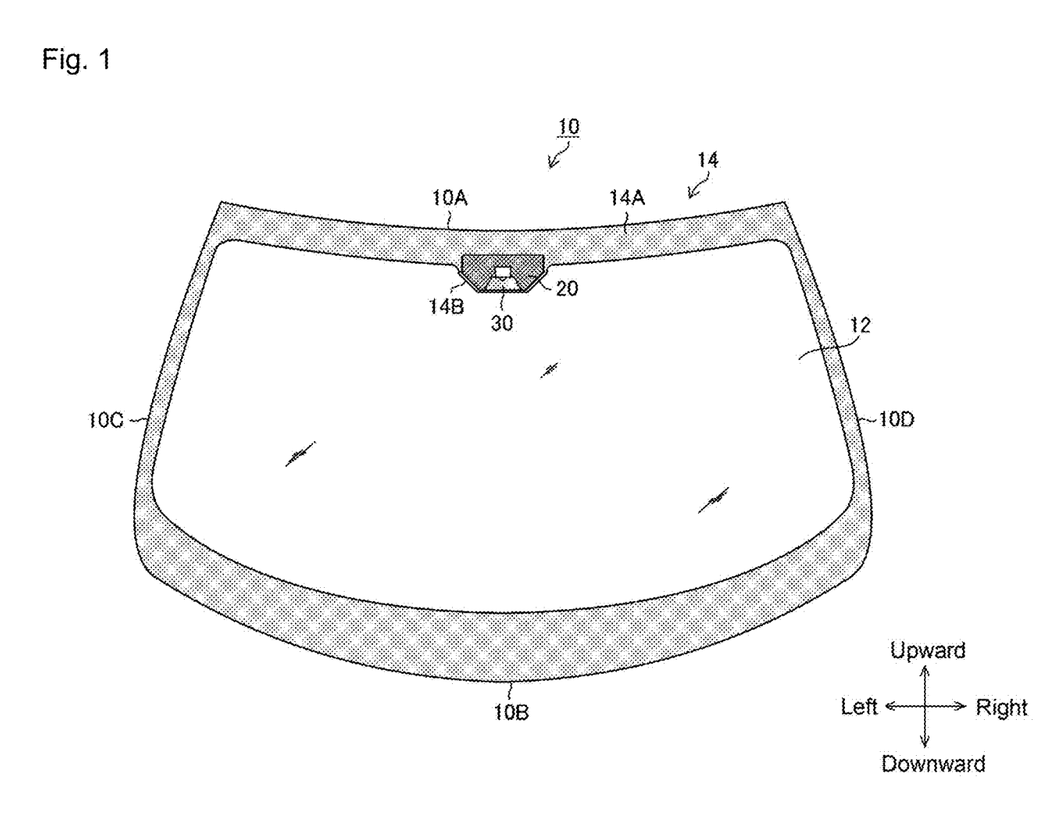
FIG. 1 is a schematic view of a vehicle window glass with an onboard camera, which is seen from an inner side.

FIG. 1 is a schematic view of the vehicle window glass with an onboard camera according to an embodiment of the present invention, which is seen from an inner side.

The vehicle window glass with an onboard camera 10 shown in FIG. 1 is applied as a windshield formed in a substantially trapezoidal shape. Nevertheless, the vehicle window glass with an onboard camera according to the present invention is also applicable to other vehicle window glasses, such as a backlite, in addition to the windshield.

The vehicle window glass with an onboard camera 10 includes a vehicle window glass 12 configured to be mounted to a vehicle, a bracket 20, an onboard camera 40 (see FIG. 2C), and a hood member 30.

When the vehicle window glass with an onboard camera 10 according to this embodiment is mounted to a front opening of the vehicle, the vehicle window glass has an edge 10A, an edge 10B, an edge 10C and an edge 10D serving as a top side, a bottom side, a left side and a right side. The vehicle window glass 12 forming the vehicle window glass with an onboard camera 10 preferably has an optical shielding area 14 on an outer peripheral edge on an inner side surface. The optical shielding area 14 may be formed by, e.g., applying, to a glass plate, a color ceramic paste including a black pigment-containing soluble glass frit, and baking the applied paste. The optical shielding area 14 forms a dark and opaque layer on a peripheral area of the vehicle window glass 12.

As shown in FIG. 1, the optical shielding area 14 may include not only a peripheral edge area 14A extending along the edges 10A, 10B, 10C and 10D but also a protruding area 14B protruding toward the edge 10B from a central portion of the peripheral edge area 14A extending along the edge 10A.

The vehicle window glass 12 may be a glass plate, which is made of, for example, soda-lime glass, borosilicate glass, alkali-free glass, or quartz glass. Among them, soda-lime glass is particularly preferable. The glass plate may be made of either non-tempered glass or tempered glass. The tempered glass may be either physically tempered glass (such as glass tempered by air quenching) or chemically tempered glass. The non-tempered glass is prepared by forming molten glass in a plate shape and annealing the formed glass. The tempered glass is prepared by producing a compressive stress layer in the surface of non-tempered glass. When the glass plate is made of physically tempered glass, the glass plate may have a glass surface tempered by uniformly heating the glass plate and quenching the heated glass plate from a temperature close to its softening point to produce compressive stress in the glass surface by its temperature difference between the glass surface and the inside of the glass plate. When the glass plate is made of chemically tempered glass, the glass plate may have a glass surface tempered by producing compressive stress in the glass surface by ion exchange or the like. Although the glass plate is preferably transparent, the glass plate may be colored to a degree not to deteriorate transparency. Although there is no particular limitation to the thickness of the glass plate, the thickness is preferably at least 0.5 mm and at most 5.0 mm. The thickness is more preferably 0.3 mm to 3.0 mm.

The vehicle window glass 12 may be a laminated glass including a plurality of glass plates. The aminated glass is made of a plurality of glass plates and an interlayer bonding the glass plates.

When the vehicle window glass 12 is a laminated glass, a glass plate that is positioned on an outer side after being mounted to a vehicle has a thickness of preferably at least 1.1 mm, more preferably at least 1.8 mm, in terms of resistance against a flipped stone or the like. The glass plate has a thickness of preferably at most 3.0 mm, more preferably at most 2.8 mm, in terms of weight reduction of the laminated glass. A glass plate that is positioned on an inner side after mounting the laminated glass to the vehicle has a thickness of preferably at most 0.3 mm in terms of handling, and preferably at most 2.3 mm in terms of weight reduction of the laminated glass. It should be noted that the glass plates used in the laminated glass may have the same thickness or different thicknesses.

Although there is no particular limitation to the material for the interlayer, the interlayer is preferably made of a thermoplastic resin, for example. Examples of the thermoplastic resin include a plasticized polyvinyl acetal-based resin, a plasticized polyvinyl chloride-based resin, a saturated polyester-based resin, a plasticized saturated polyester-based resin, a polyurethane-based resin, a plasticized polyurethane-based resin, an ethylene-vinyl acetate copolymer-based resin, an ethylene-ethylacrylate copolymer-based resin, a cycloolefin polymer resin, and an ionomer resin. The resin composition that contains a hydrogenation product of a modified block copolymer composition disclosed in Japanese Patent No. 6065221 is also preferably applicable. Among them, the plasticized polyvinyl acetal-based resin is more preferable because of providing an excellent balance in various performances, such as transparency, weathering resistance, strength, adhesion, penetration resistance, impact energy absorbability, humidity resistance, heat insulation, and sound insulation. Examples of the polyvinyl acetal-based resin include a polyvinyl formal resin obtainable by reacting polyvinyl alcohol (PVA) and formaldehyde, a narrowly-defined polyvinyl acetal-based resin obtainable by reacting PVA and acetaldehyde, and a polyvinyl butyral resin (PVB) obtainable by reacting PVA and n-butylaldehyde. Among them, PVB is more preferable because of providing an excellent balance in various performances, such as transparency, weathering resistance, strength, adhesion, penetration resistance, impact energy absorbability, humidity resistance, heat insulation, and sound insulation. A single kind of polyvinyl acetal-based resin, or a combination of two kind or more of polyvinyl acetal-based resins may be used.

The vehicle window glass 12 may be curved. When the vehicle window glass 12 is a laminated glass, the glass plates, which are positioned on the outer side and on the inner side after being mounted to the vehicle, may be processed and curved so as to have certain radiuses of curvature, respectively. The radiuses of curvature of the glass plates range from 1,000 to 100,000 mm. When the vehicle window glass 12 is curved, the vehicle window glass 12 may be curved so as to be convex toward the outer side after being mounted to the vehicle. When the glass plates are made of inorganic glass formed in a curved shape, the glass plates may be bent by gravity bending, press bending or the like after formation by the float process. Bending is made by heating the glass or softening. The heating temperature of the glass at bending is at least about 550° C. and at most about 700° C. The vehicle window glass 12 may be formed in a single bent shape to be bent only in one of an upward and downward direction or a right and left direction, or in a compound bent shape to be bent in the upward and downward direction and the right and left direction. When the vehicle window glass 12 is a laminated glass, the glass plates, which are positioned on the outer side and the inner side after being mounted to the vehicle, may have the same radius of curvature or different radiuses of curvature.

The bracket 20 is fixed to the inner side surface of the vehicle window glass 12. The bracket 20 is preferably fixed to the vehicle window glass 12 in the optical shielding area 14.

The bracket 20 serves as a member required for attaching onboard parts, such as the onboard camera 40, to the inner side surface of the vehicle window glass 12. The bracket 20 can be disposed between the onboard camera 40 and the vehicle window glass 12 to facilitate the attachment work of the onboard camera 40 to the inner side surface of the vehicle window glass 12.

Figure 2A:
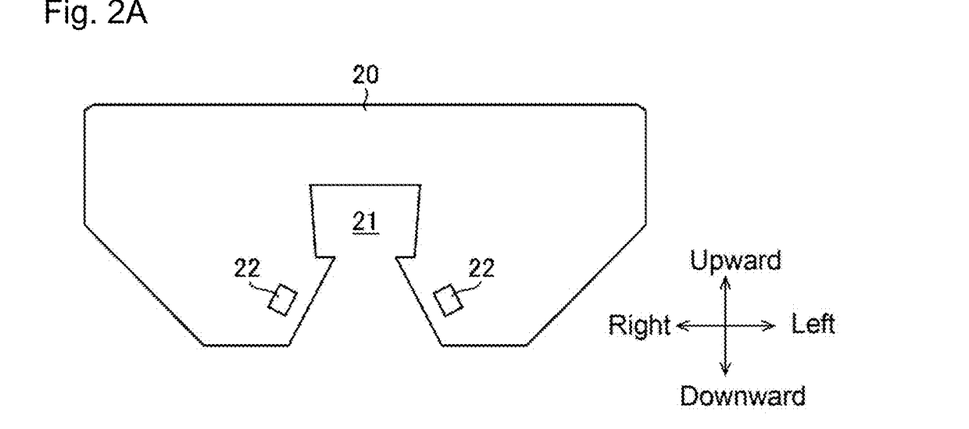
FIGS. 2A to 2C are plan views of a bracket, a hood member and the onboard camera, which are seen from an outer side.
Figure 2B:
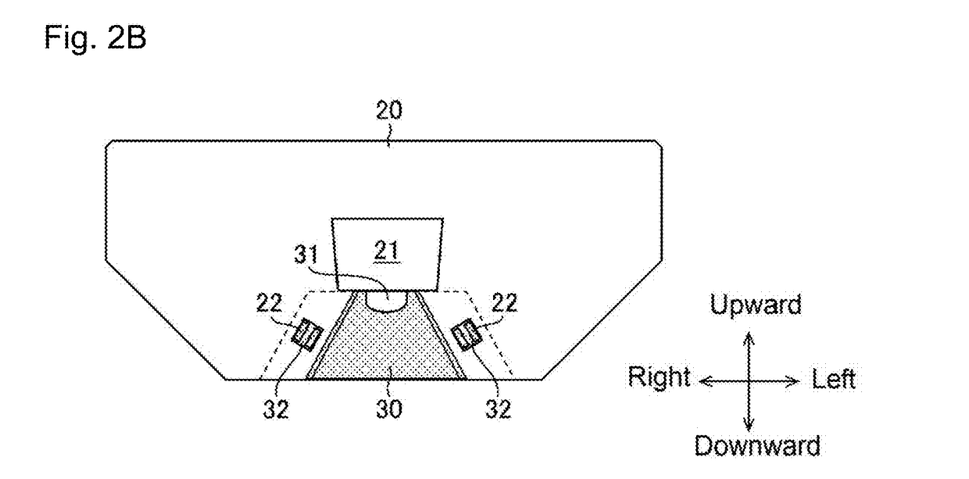
Figure 2C:
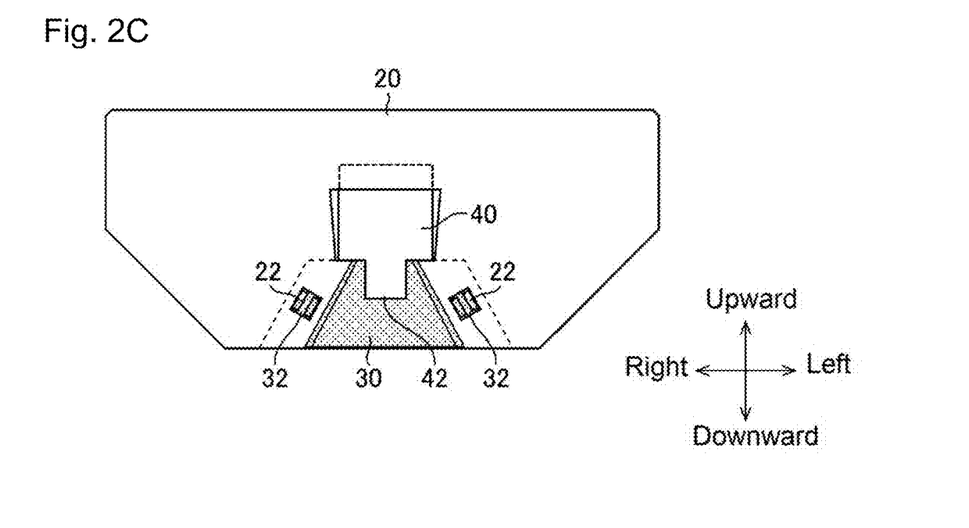

FIGS. 2A to 2C are plan views illustrating the bracket, the hood member and the onboard camera, which are seen from the outer side after the bracket is attached to the vehicle window glass. FIG. 2A is a plan view of the bracket, FIG. 2B is a plan view where the hood member is attached to the bracket, and FIG. 2C is a plan view where the onboard camera is attached to the bracket.

As shown in FIG. 2A, the bracket 20 is formed of a plate having an opening 21 as one example. The opening 21 includes a rectangular opening formed in a substantially central portion of the bracket 20, and an isosceles trapezoidal opening continuous to the rectangular opening. The isosceles trapezoidal opening spreads in a forward direction. The bracket 20 has two engaged portions 22 disposed thereon.

As shown in FIG. 2B, the hood member 30 is disposed, for example, on the inner side so as to cover the isosceles trapezoidal opening of the bracket 20. The hood member 30 has, for example, a cutout portion 31 formed in an oval shape so as to extend toward the forward direction in a portion adjacent the shorter base of the isosceles trapezoidal shape.

The bracket 20 and the hood member 30 are formed as individual parts. The hood member 30 has two engageable portions 32 disposed thereon while the bracket 20 has the two engaged portions 22 formed thereon so as to be engageable with the engageable portions 32. The hood member 30 and the bracket 20 are coupled by engagement of the engageable portions 32 with the engaged portions 22. The hood member 30 is preferably disposed on the bracket 20. Thus, it becomes easily to handle the bracket 20 and the hood member 30.

The bracket 20 may be a first resin material, and the hood member 30 may be a second resin material. The first resin material and the second resin material are preferably different from each other. When the bracket 20 and the hood member 30 are made of a resin material (or the first resin material and the second resin material), both members can be easily molded in shapes suited to the vehicle. When the first resin material and the second resin material are different from each other, the bracket 20 and the hood member 30 can achieve to have their appropriate properties.

Although it is shown in FIG. 2B that the bracket 20 and the hood member 30 are coupled by engagement of the engageable portions 32 with the engaged portions 22, the coupling of both members is not limited to this mode. The hood member 30 may be bonded to the bracket 20 by an adhesive or a double-sided tape.

As another embodiment, the bracket 20 and the hood member 30 may be wholly formed as a single molded product. The bracket 20 and the hood member 30 may be formed as a two-color molded product. In a case where the bracket 20 and the hood member 30 are made of the first and second resin materials, respectively, such that the first and second resin materials are different from each other, both members can be more easily produced as a two-color molded product. Examples of the first resin material include PBT (polybutylene terephthalate), EPDM (ethylene-propylene-diene rubber), PS (polystyrene), PC (polycarbonate), PP (polypropylene), TPO (olefin-based elastomer), an ABS resin, natural rubber, chloroprene rubber, PEI (polyether imide), and PA66 (nylon 66). Examples of the second resin material include PBT (polybutylene terephthalate), EPDM (ethylene-propylene-diene rubber), PS (polystyrene), PC (polycarbonate), PP (polypropylene), TPO (olefin-based elastomer), an ABS resin, natural rubber, chloroprene rubber, PEI (polyether imide), and PA66 (nylon 66).

As shown in FIG. 2C, the onboard camera 40 equipped with a photographic lens 42 is attached to the bracket 20 so as to be disposed at the opening 21. The photographic lens 42 of the onboard camera 40 is positioned at the cutout portion 31 of the hood member 30. There is no specific limitation to the shape of the opening 21 so long as the photographic lens 42 is exposed.

As shown in FIG. 2C, the hood member 30 is disposed in front of the onboard camera 40 and is formed in the isosceles trapezoidal shape, which spreads a vehicle width direction toward the forward direction. When the bracket 20 is attached to the vehicle window glass 12 (not shown), the photographic lens 42 of the onboard camera 40 is directed to the vehicle window glass 12 through the opening 21 of the bracket 20. By the hood member 30, rays coming from the inner side are prevented from being reflected on the inner side surface of the vehicle window glass 12 such that a reflected image is projected into the photographic lens 42 of the onboard camera 40.

The hood member 30 is formed in the isosceles trapezoidal form spreading toward the vehicle width direction as described above. The isosceles trapezoidal shape is not only a complete isosceles trapezoidal shape but also a substantially isosceles trapezoidal shape regarded as an isosceles trapezoidal shape at a glance. It should be noted that the shape of the hood member is not limited to the isosceles trapezoidal shape. It is sufficient that the hood member 30 is formed in a shape spreading in the vehicle width direction. The hood member may be formed in a hexagonal shape, an octagonal shape or fan shape.

Figure 3A:
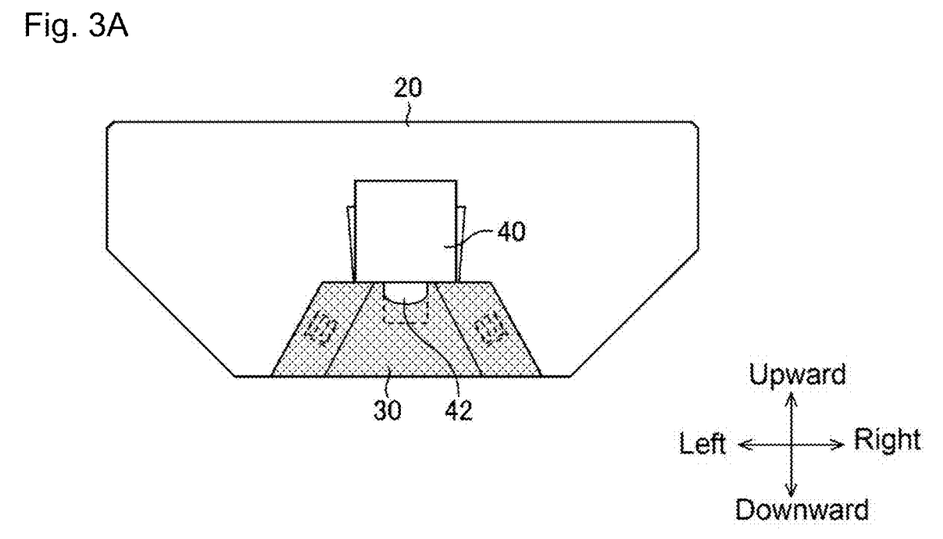
FIGS. 3A and 3B are a plan view illustrating the bracket, the hood member and the onboard camera, and a plan view illustrating a cover, where these members are seen from the inner side.
Figure 3B:
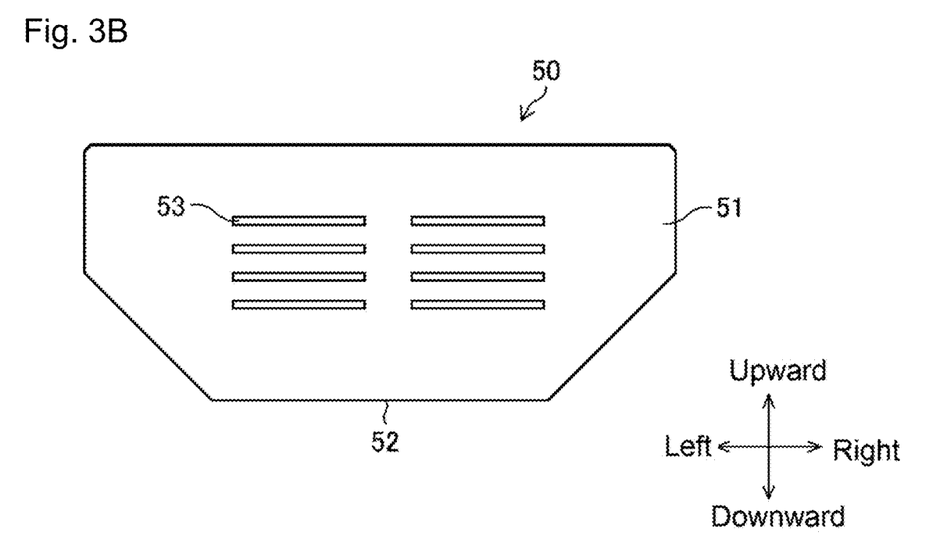

FIGS. 3A and 3B are a plan view illustrating the bracket, the hood member and the onboard camera, and a plan view illustrating a cover, which are seen from the inner side after attaching the bracket to the vehicle window glass. FIG. 3A is a plan view illustrating the bracket, the hood member and the onboard camera while FIG. 3B is a plan view illustrating the cover, which is attached to the bracket.

As shown in FIG. 3A, the onboard camera 40 is attached to an inner side surface of the bracket 20. The photographic lens 43 is partly covered by the hood member 30.

Although only the onboard camera 40 is shown in FIG. 3A, to the inner side surface of the bracket 20 is attached at least one of onboard parts, such as onboard sensors including a raindrop sensor (rain sensor), a defrost sensor, a temperature sensor, a humidity sensor and a millimeter wave sensor; an ETCS (electronic toll collection system) antenna, an antenna for radio communication or digital terrestrial television; and communication equipment including an intercommunication radio wave module and a radio wave receiving amplifier.

As shown in FIG. 3B, the bracket 20 is preferably provided with the cover 50 on the inner side for example. The onboard parts, such as the onboard camera 40, are hardly visible from the inner side and are protected by the cover 50.

The cover 50 may be formed of a bottom surface 51 opposing the bracket 20, and a side surface 52 continuous with the bottom surface and protruding toward the bracket 20. The side surface 52 is disposed along the entire periphery of the bottom surface 51 so as to surround the bottom surface 51. The cover 50 preferably has slits 53 formed therein. The slits 53 serve to release heat generated by the onboard parts, to outside.

Figure 4A:
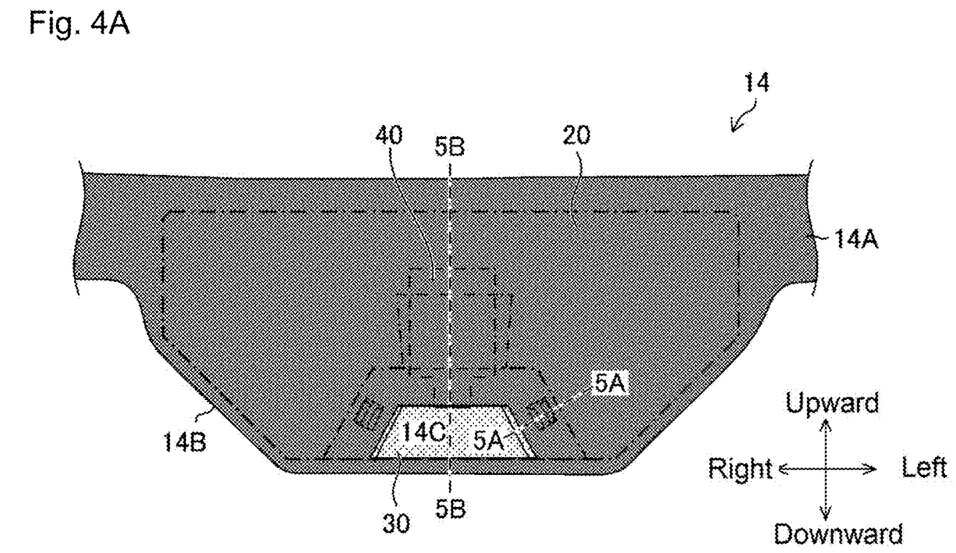
FIGS. 4A and 4B are enlarged views of the vehicle window glass with an onboard camera, which is seen from the outer side.
Figure 4B:
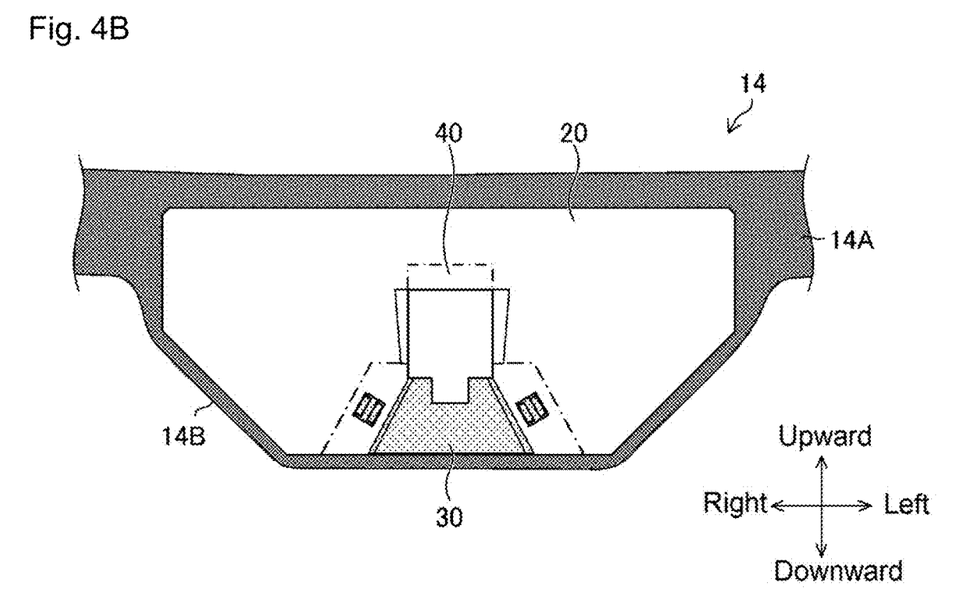

FIGS. 4A and 4B are enlarged views where the vehicle window glass with an onboard camera is seen from the outer side. FIG. 4A is a plan view illustrating how the bracket 20 is fixed to the vehicle window glass 12 in the optical shielding area 14 of the vehicle window glass 12.

In this embodiment, the bracket 20 is fixed in the peripheral edge area 14A and the protruding area 14B as shown in FIG. 4A. The bracket 20 is preferably fixed to the vehicle window glass 12 in the optical shielding area 14 because when the bracket 20 is seen from the outer side, the bracket 20 is mostly shielded by the optical shielding area 14 such that it is possible not only to prevent the appearance from being impaired but also to protect the adhesive for bonding the bracket 20 to the vehicle window glass 12.

The optical shielding area 14 has an opening 14C formed in the protruding area 14B. The opening 14C is formed so as not to obstruct the visual field of the photographic lens 42 of the onboard camera 40. The opening 14C corresponds to the viewing angle range of the photographic lens 42. The photographic lens 42 of the onboard camera 40 is directed to the forward side of the vehicle from the opening 21 of the bracket 20 through the opening 14C of the protruding area 14B. The hood member 30 is exposed from the opening 14C and faces the outer side.

FIG. 4B is a plan view where a portion of the optical shielding area 14 corresponding to the bracket 20 is omitted in FIG. 4A. It is clarified that the bracket 20 is fixed in the optical shielding area 14.

Figure 5A:
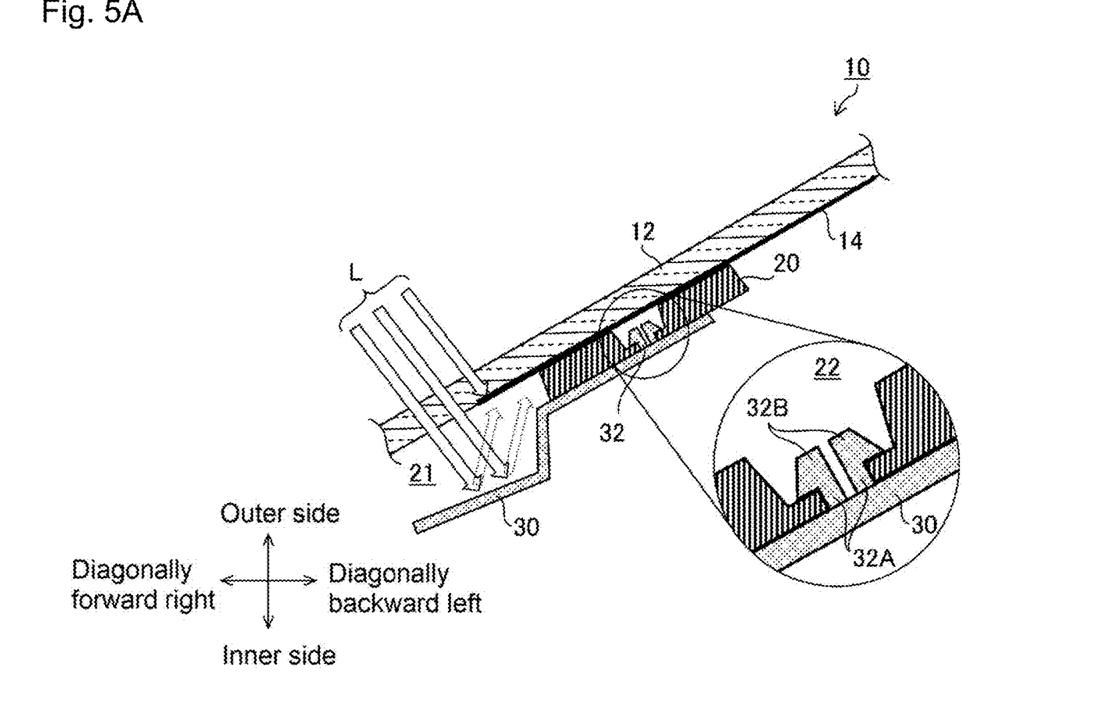
FIGS. 5A and 5B are cross-sectional views taken along line 5A-5A and line 5B-5B in FIG. 4A, respectively.
Figure 5B:
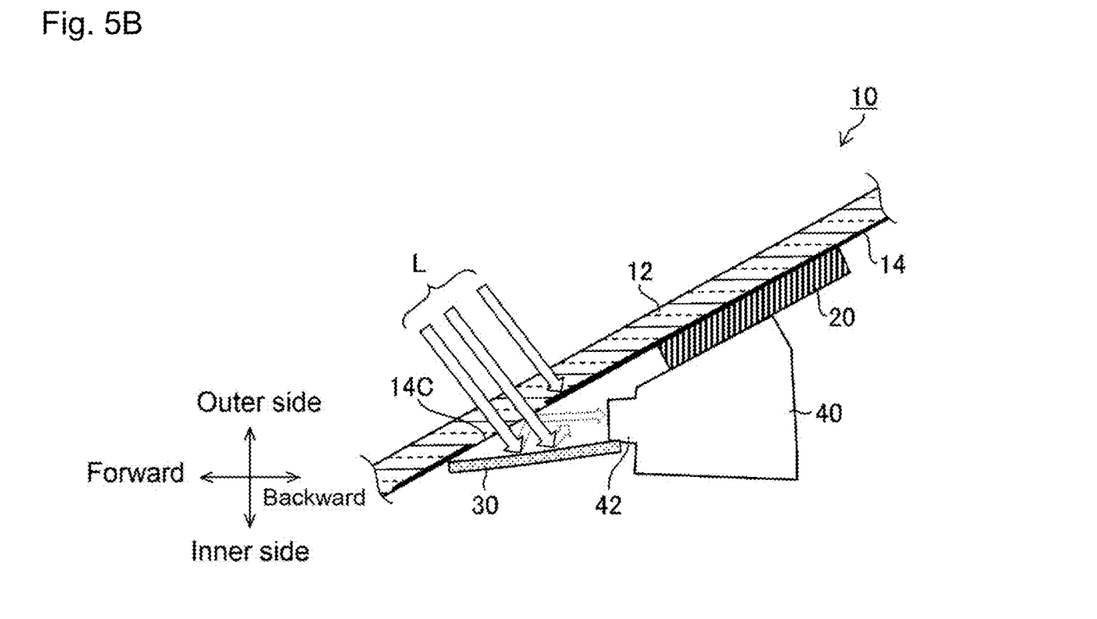

FIGS. 5A and 5B are cross-sectional views of FIG. 4A, more specifically a cross-sectional view taken along line 5A-5A of FIG. 5A and a cross-sectional view taken along line 5B-5B of FIG. 5A.

As shown in FIG. 5A, the engageable portions 32 of the hood member 30 are brought into engagement with the engaged portions 22 of the bracket 20. The engageable portions 32 and the engaged portions 22 shown in FIG. 5A are formed in a snap-fit structure. Each of the engageable portions 32 is formed by a pair of claw parts 32A extending from a flat surface of the hood member 30 toward the bracket 20. The paired claw parts 32A have wide portions 32B formed at leading edges. The paired claw parts 32A are formed so as to be elastically deformable at root portions protruding from the hood member 30. Each of the engaged portions 22 is formed of an opening.

When paired claw parts 32A are inserted into the opening of their corresponding engaged portion 22, the paired claw parts 32A are elastically deformed such that the wide portions 32B can pass through the engaged portion 22 as the opening. After the wide portions 32B pass through the engaged portion 22 as the opening, the paired claw parts 32A return to the shape prior to elastic deformation. In this state, the wide portions 32B are made larger than the opening of the engaged portion 22 such that the engageable portion 32 and the engaged portion 22 are brought into engagement with each other to prevent detachment.

As shown in FIG. 5A, the hood member 30 extends downward toward the opening 21 of the bracket 20, and further extends in the forward direction. The hood member 30 are preferably bent stepwise at two portions as shown in FIG. 5A such that the cutout portion 31 is formed so as to extend across the two bent portions.

As shown in FIG. 5B, the onboard camera 40 is attached to the bracket 20. The photographic lens 42 of the onboard camera 40 is directed to the outer side through the opening 21 and the opening 14C. The hood member 30 is disposed so as to extend in the forward direction in front of the onboard camera 40 beyond the onboard camera 40.

Figure 6:
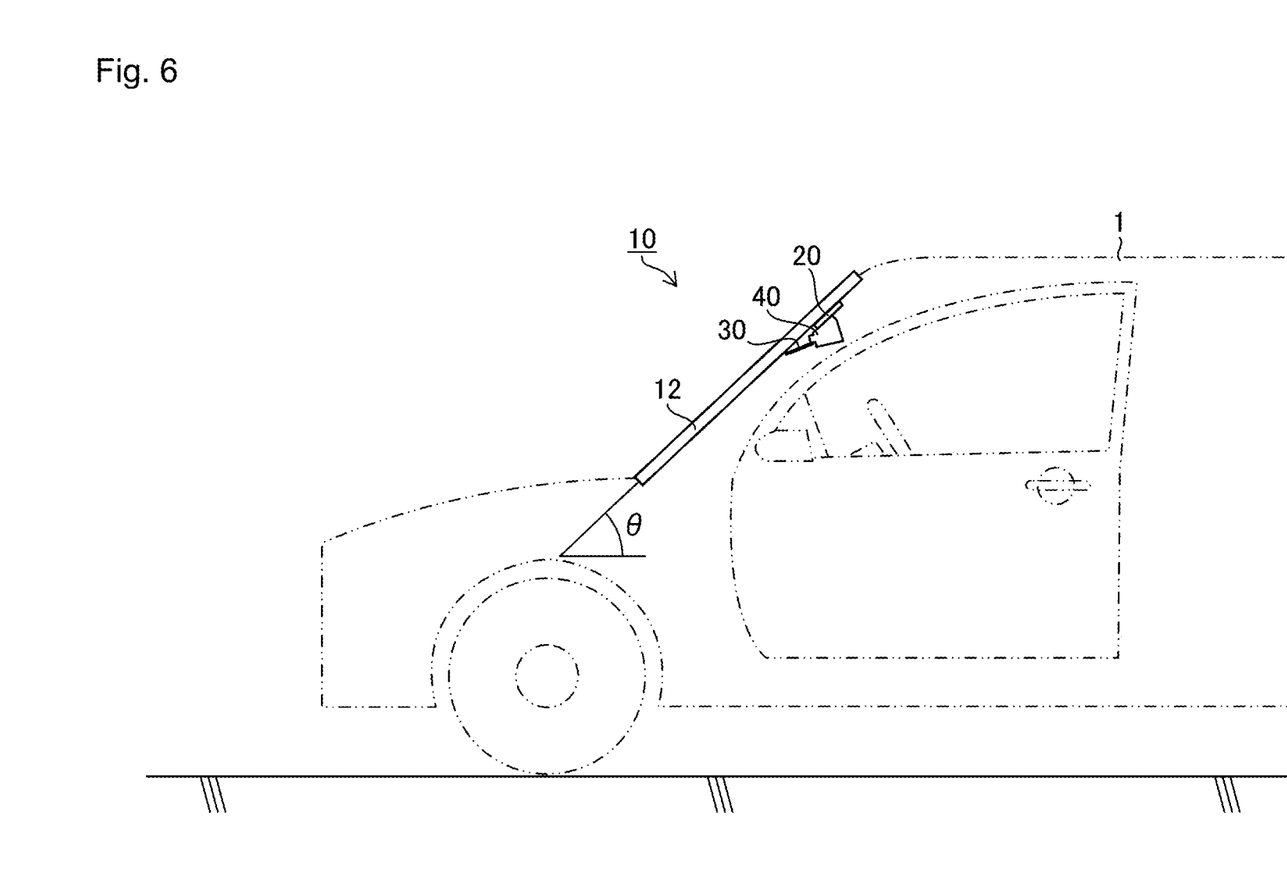
FIG. 6 is a schematic view illustrating the installation angle of the vehicle window glass with an onboard camera, which is mounted to a vehicle.

It is shown in FIG. 6 how the vehicle window glass with an onboard camera 10 has been attached to the vehicle 1. As shown in FIG. 6, the bracket 20 with the hood member 30 and the onboard camera 40 attached thereto is fixed to the inner side of the vehicle window glass 12.

The vehicle window glass 12 is mounted to the vehicle 1 in an installation angle θ of preferably from 20 to 80 degrees. The installation angle θ means an angle formed by a centerline and a horizontal plane (plane parallel with a horizontal ground surface) wherein the centerline is formed by subsequently connecting center points of the vehicle window glass 12 in the horizontal width direction from the top side to the bottom side.

Now, the projection made by the hood member 30 will be described in reference to FIGS. 5A and 5B.

In general, the hood member 30 is formed of a resin member colored in black such that rays L coming from the outer side are prevented from being projected into the onboard camera 40. Nevertheless, rays L transmitting through the vehicle window glass 12 from the outer side are reflected toward the vehicle window glass 12 on the hood member 30 in some cases as shown in FIGS. 5A and 5B.

For example, rays L from the outer side are reflected toward the vehicle window glass 12 on the hood member 30 as shown in FIG. 5A. The reflected rays L are applied to the optical shielding area 14 on the inner side of the vehicle window glass 12 as indicated with dotted lines in FIG. 5A. In this case, the reflected image is prevented from being projected into the photographic lens 42 of the onboard camera 40.

Likewise, rays L from the outer side are reflected toward the vehicle window glass 12 on the hood member 30 as indicated with dotted lines in FIG. 5B. Further, the reflected rays L are applied to the vehicle window glass 12 through the opening 14C of the optical shielding area 14 as shown with a dotted line in FIG. 5B. In this case, the hood member 30 is also disposed in a position in front of the onboard camera 40, a reflected image from the vehicle window glass 12 could be projected into the photographic lens 42 of the onboard camera 40, causing the onboard camera 40 to make an incorrect detection in some cases unless some measures are taken.

As a result of intensive studies by the inventors, it has been found as explained in the examples described later that when the hood member 30 has a surface facing the vehicle window glass 12 and provided with a black appearance having an L value of at most 27.0 and is made of a material having a gloss value of less than 6.0 measured based on JIS Z 8741-1997, rays transmitting through the vehicle window glass 12 are prevented from being reflected on the hood member 30 such that a reflected image is projected on the vehicle window glass 12. It should be noted that the L value indicates a brightness in a color space, where a lower value indicates darker. The gloss value represents mirror surface glossiness, where a higher gloss value represents a stronger glossiness while a lower gloss value represents a weaker glossiness. In the embodiments, the L value is preferably at most 27.0, and the gloss value is preferably less than 6.0. The L value is more preferably at most 26.0, and the gloss value is more preferably at most 3.0. When the surface of the hood member 30 has an L value of at most 27.0 and a gloss value of less than 6.0, the onboard camera 40 is prevented from incorrectly detecting a reflected image since rays transmitting through the vehicle window glass 12 are prevented from being reflected on the hood member 30 such that a reflected image is projected on the vehicle window glass 12.

EXAMPLES

Now, Examples of the present invention will be presented, and these examples will be described in detail. It should be noted that the present invention is not limited to these Examples.

Test Example

Hood members were prepared so as to be made of materials from Test Example 1 to Test Example 11, and evaluation was made for the respective Test Examples.

Test Example 1

The hood member of Test Example 1 was made of PBT-GF30 (polybutylene terephthalate: glass fibers contained in a blending amount of 30% by weight based on the total weight of the resin material and the glass fibers). The hood member of Test Example 1 had a coated film formed on a surface facing a vehicle window glass, the coated film being made of a primer and a black synthetic resin coating containing delustering pigment.

Test Example 2

The hood member of Test Example 2 was made of PBT-GF30 (polybutylene terephthalate: glass fibers contained in a blending amount of 30% by weight based on the total weight of the resin material and the glass fibers), as in Test Example 1, except that the coated film was disposed on a surface facing the vehicle window glass.

Test Example 3 to Test Example 11

Regarding the hood members of Test Example 3 to Test Example 11, the surfaces facing the vehicle window glass were made of the following materials. Test Example 3 was made of an EPDM (ethylene propylene diene rubber) sponge. Test Example 4 was made of PS (polystyrene) having a first embossed pattern (embossed sample TH166A of TANAZAWA HAKKOSHA CO., LTD.). Test Example 5 was made of PS having a second embossed pattern (embossed sample TH118 on TANAZAWA HAKKOSHA CO., LTD.). Test Example 6 was made of an NR (natural rubber) sponge. Test Example 7 was made of chloroprene rubber. Test Example 8 was made of sandpaper #180. Test Example 9 was made of sandpaper #400. Test Example 10 was made of PP (polypropylene) having a third embossed pattern (embossed sample GR-001 of MOLD-TECH JAPAN: 100%). Test Example 11 was made of PA6 (polyamide 6 (nylon 6)).

<Evaluation>

The measurement of the L value of the black appearance, the measurement of the gloss value measured based on JIS Z8741-1997, and the evaluation of reflection to the glass were made for the hood member of each of Test Example 1 to Test Example 11. The measurement of the L value was made by use of CM-700d (colorimeter: manufactured by KONICA MINOLTA, INC.). The light source was D65, and the viewing angle was set at 10 degrees. The measurement of the gloss value was made by use of VG7000 (manufactured by NIPPON DENSHOKU INDUSTRIES CO., LTD.).

The evaluation of the reflection to the glass was made by visual inspection with the hood member of each of Test Example 1 to Test Example 11 being disposed in front of an onboard camera as shown in FIG. 5B. Test Example 1 that prevented reflection to the glass, and Test Examples that had the same level as Test Example 1 in terms of reflection are determined as being "excellent", Test Examples that although there were a bit of reflection to the glass, there were no problem in use were determined as being "acceptable", and Test Examples that the reflection to the glass was caused to bring about a problem in actual use were determined as being "unacceptable".

Table 1 shows the measurement results and the evaluation results for Test Example 1 to Test Example 11. As seen from Table 1, it is understood that Test Examples that had a black appearance an L value of at most 27.0 and a gloss value of less than 6.0 measured based on JIS Z8741-1997 are determined as being "excellent" or "acceptable" in terms of evaluation of the reflection to the glass, except for Test Example 4. What is important is that a material having a black appearance with an L value of at most 27.0 and a gloss value of less than 6.0 are applicable to the hood member without no particular limitation, and can prevent reflection to the glass.

TABLE 1

| | Material | Blackness (L value) | Gloss value | Reflection to glass |
|---|---|---|---|---|
| 1 | PBT-GF30 (having coated film) | 22.04 | 0.4 | Excellent |
| 2 | PBT-GF30 (having no coated film) | 25.71 | 0.7 | Excellent |
| 3 | EPDM Sponge | 18.84 | 0.1 | Excellent |
| 4 | PS + first embossed pattern | 27.33 | 3.6 | Unacceptable |
| 5 | PS + second embossed pattern | 26.54 | 2.7 | Acceptable |
| 6 | NR Sponge | 22.39 | 0.2 | Excellent |
| 7 | Chloroprene rubber | 22.73 | 6 | Unacceptable |
| 8 | Sandpaper #180 | 18.92 | 0.1 | Excellent |
| 9 | Sandpaper #400 | 23 | 0.3 | Acceptable |
| 10 | PP + third embossed pattern | 24.26 | 6.3 | Unacceptable |
| 11 | PA6 (nylon 6) | 74.45 | 10.5 | Unacceptable |

Other Preferable Embodiments

Now, preferred embodiments of the vehicle window glass with an onboard camera will be described.

The above-mentioned bracket 20 is preferably mainly made of PBT-GF30 because of being required to have rigidity and be hardly to expand under high temperatures.

Likewise, the hood member 30 may be made of PBT-GF30. In this case, the hood member 30 is required to have a gloss value of less than 6.0 for the purpose of reducing projection. In order to set the gloss value at less than 6.0, treatment is applied to provide irregularities to the surface of a mold for molding the hood member 30 and transfer the irregularities onto the hood member 30. However, since PBT-GF30 contains glass fibers in a blending amount of 30% by weight based on the total weight of the resin material and the glass fibers, the glass fibers could erode irregularities on the surface of the mold to make the gloss value unstable.

From this point of view, the first resin material applied to the bracket 20 is preferably made of a resin material containing glass fibers in a blending amount of at least 30% by weight based on the total weight of the resin material and the glass fibers, and the second resin material applied to the hood member 30 is preferably made of a resin material containing glass fibers in a blending amount of less than 30% by weight based on the total weight of the resin material and the glass fibers. The wording "containing glass fibers in a blending amount of less than 30% by weight" covers a case where no glass fibers are contained. In this way, it is possible to achieve a gloss value of less than 6.0.

Embodiments of the present invention have been described. The present invention is not limited to the above-mentioned embodiments. Various improvements and modifications can be made without departing from the spirit of the present invention.

The entire disclosure of Japanese Patent Application No. 2021-048530 filed on Mar. 23, 2021 including specification, claims, drawings and summary is incorporated herein by reference in its entirety.

What is claimed is:

1. A vehicle window glass with an onboard camera, comprising:
    a vehicle window glass configured to be mounted to a vehicle;

a bracket fixed to an inner side surface of the vehicle window glass;

an onboard camera attached to the bracket; and a hood member disposed on a vehicle forward side of the onboard camera;

wherein the bracket is made of a first resin material, the hood member is made of a second resin material, and the first resin material and the second resin material are different from each other;

wherein the first resin material comprises a resin material comprising glass fibers in a blending amount of at least 30% by weight based on the total weight of the first resin material and the glass fibers, and the second resin material comprises a resin material comprising glass fibers in a blending amount of less than 30% by weight based on the total weight of the second resin material and the glass fibers;

wherein the hood member has a surface facing the vehicle window glass and exhibiting a black appearance having an L value of at most 27.0 measured using a colorimeter with a D65 light source and a viewing angle of 10 degrees, wherein the L value indicates a brightness in a color space, wherein lower L values indicate darker; and wherein the hood member is made of a material having a gloss value of less than 6.0 measured based on JIS Z 8741-1997.

2. The vehicle window glass according to claim 1, wherein the hood member is disposed on the bracket.

3. The vehicle window glass according to claim 1, wherein the bracket and the hood member are an integrally molded product.

4. The vehicle window glass according to claim 3, wherein the bracket and the hood member are a two-color molded product.

5. The vehicle window glass according to claim 1, wherein the bracket and the hood member are individual parts, and the hood member is bonded to the bracket by an adhesive or a double-sided tape.

6. The vehicle window glass according to claim 1, wherein the bracket and the hood member are individual parts, the hood member has an engageable portion formed thereon, and the bracket has an engaged portion thereon; and wherein the hood member and the bracket are configured to be coupled by bringing the engageable portion and the engaged portion into engagement.

7. The vehicle window glass according to claim 1, wherein the vehicle window glass has an optical shielding area disposed on an outer peripheral edge of the inner side surface, and the bracket is fixed to the vehicle window glass in the optical shielding area.

8. The vehicle window glass according to claim 1, wherein the vehicle window glass is mounted to the vehicle at an installation angle of 20 to 80 degrees.

* * * * *